Figure 1:
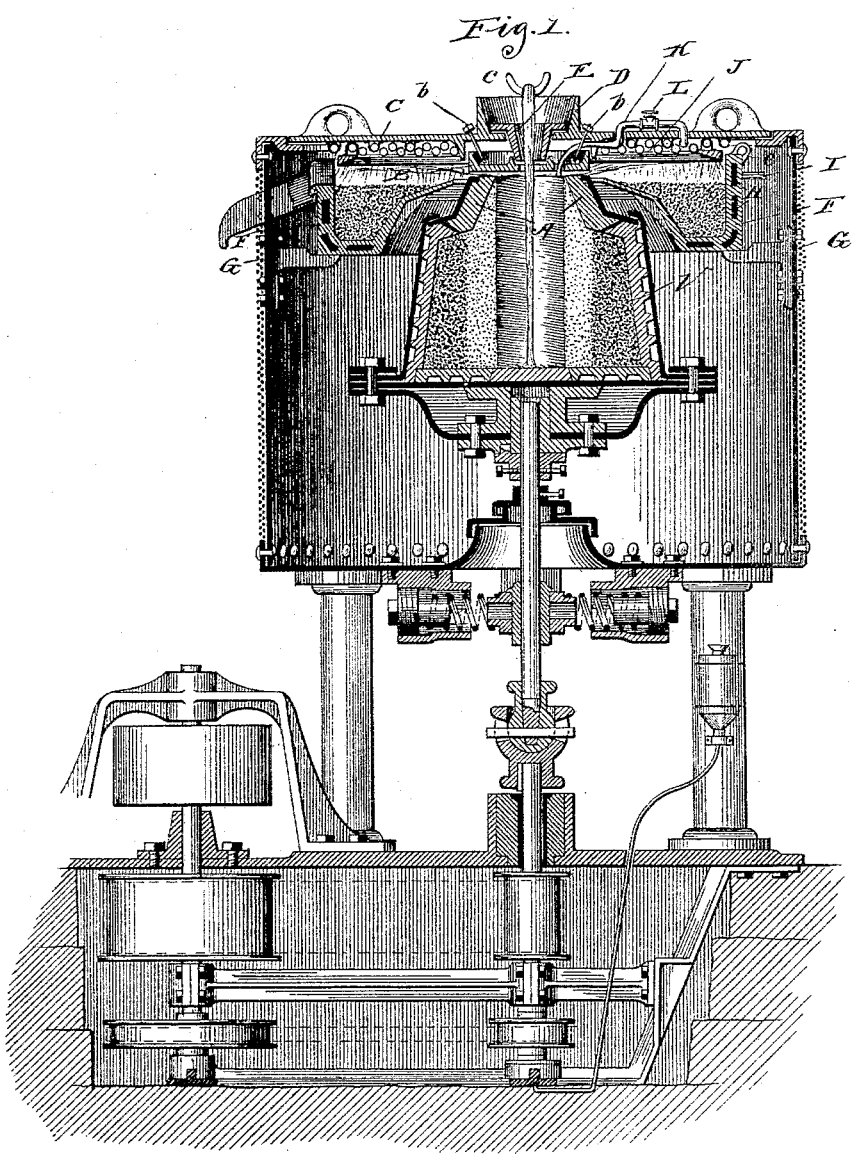

(No Model.) 2 Sheets—Sheet 1.

P. H. ADAMS, Jr. & O. T. X. ADAMS.
APPARATUS FOR USE IN DECOMPOSING METALLIC SALTS AND DESULPHURIZING ORES.

No. 399,113. Patented Mar. 5, 1889.

Witnesses,
Chas. E. Gaylord.
Clifford N. White.

Inventors
Phineas H. Adams Jr.,
Orsemas T. X. Adams,
By Banning & Banning & Payson
Atty's.

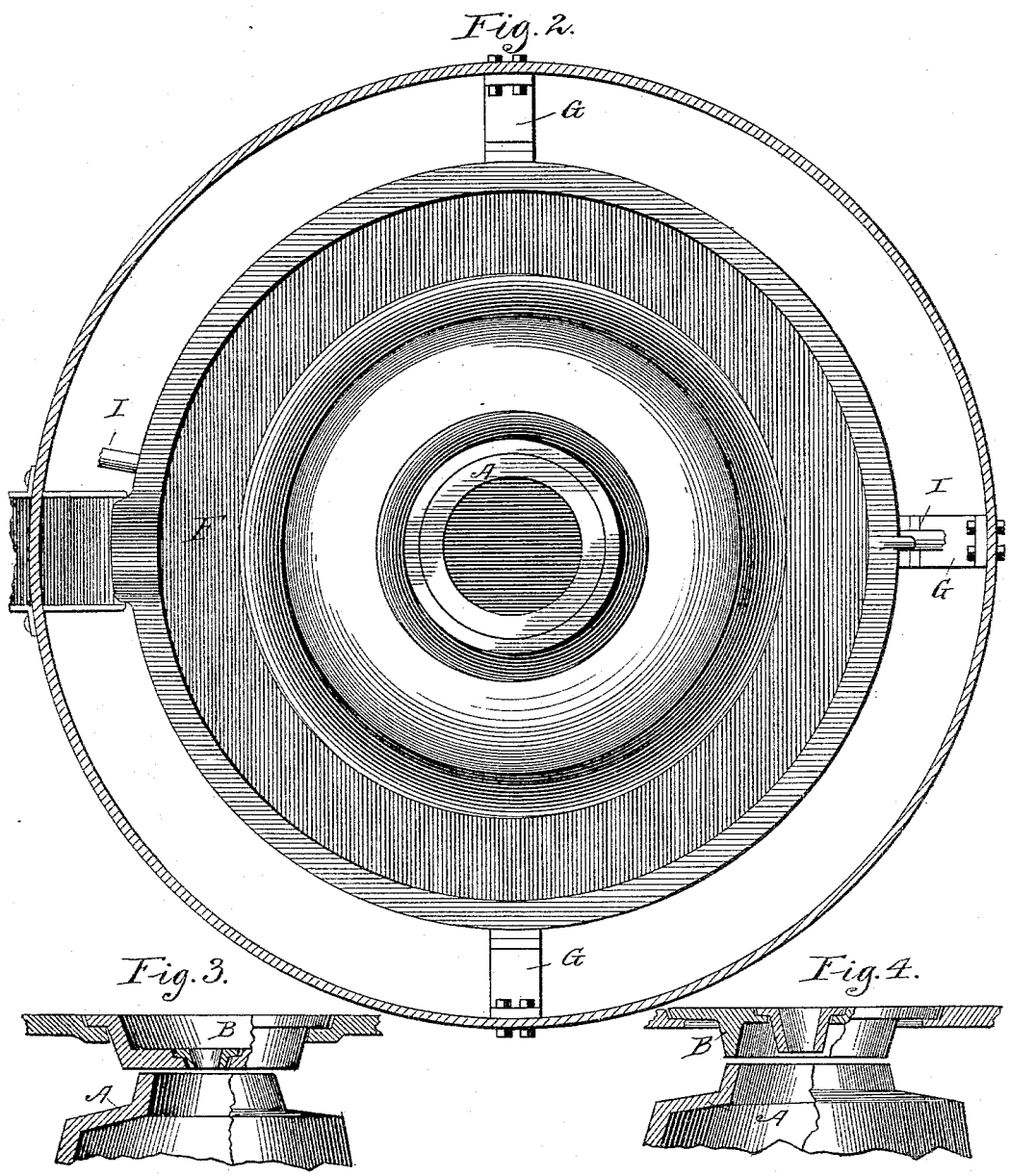

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

APPARATUS FOR USE IN DECOMPOSING METALLIC SALTS AND DESULPHURIZING ORES.

SPECIFICATION forming part of Letters Patent No. 399,113, dated March 5, 1889.

Application filed December 8, 1888. Serial No. 293,055. (No model.)

*To all whom it may concern:*

Be it known that we, PHINEAS H. ADAMS, Jr., and OR EMAS T. X. ADAMS, citizens of the United States, residing at Chicago, Illinois, have invented certain new and useful Improvements in Apparatus for Use in Decomposing Metallic Salts and Desulphurizing Ores, of which the following is a specification.

The object of our invention is to improve an apparatus for mechanically decomposing chemical compounds, metallic salts, and desulphurizing ores or their resulting material, when the substances treated are in a molten condition, by the action of centrifugal force; and our invention consists in the features and details of construction hereinafter described and claimed.

In the drawings, Figure 1 is a vertical section of the apparatus, showing the lower portion of the running-gear in elevation. Fig. 2 is a plan view of the apparatus with the cover or top removed, and Figs. 3 and 4 represent modifications of a feature of construction hereinafter described.

In making our improved apparatus for decomposing chemical compounds, metallic salts, or salts of metal, and desulphurizing ores, we make a receiving-vessel, V, adapted to receive the substance to be treated when in a molten condition. This receiving-vessel is mounted and rests upon an actuating-shaft, to which it is fixed or keyed in such a way that by the rotation of the shaft the receiving-vessel will be revolved. The receiving-vessel may be made in such way as will secure the required strength and reduce the conduction of heat from the interior to the exterior. It may be surrounded by curbing and have a removable bottom to facilitate the removal of the material which is not thrown off at the top by the action of centrifugal force, and in other respects it may be made as will be calculated to subserve the end in view and permit of its being rotated at a high rate of speed for the separation of particles of different degrees of density in the matter treated. Many of its parts and the details of their construction, and particularly the running-gear by which the receiving-vessel is supported and rotated, as they do not form the subject-matter of our present claims, need not be more fully described, as they will be sufficiently understood from an inspection of the drawings. In making the receiving-vessel, however, we prefer to provide it with a mouth or neck, A, of a refractory material that will be capable of withstanding the action of the great heat to which it will be subjected, as the molten material treated is discharged past and in contact with it, and we regard this as being of the more importance, from the fact that the intensity of the heat to which it is subjected is greatly increased by the presence of a body of molten material accumulating around the outside of the neck or mouth of the receiving-vessel as it is discharged therefrom, as hereinafter described, and from the fact that means, as hereinafter described, are provided for covering the mouth of the receiving-vessel and retaining the heat therein. We regard cast-iron and similar material as lacking sufficient durability for the purpose. When, therefore, we speak in the claims of a refractory neck or mouth, we mean one composed of a composition or material of greater refractory quality than cast-iron—as fire-clay, for example. We also prefer to arrange a cover or plate, B, immediately above the mouth or neck of the receiving-vessel, with a hole in it of sufficient size to permit the molten material to pass through as it is introduced into the receiving-vessel. This plate or cover is preferably suspended by tie-rods extending up through the top and provided with nuts $b$, by which they may be adjusted up or down to secure the desired space between the mouth of the receiving-vessel and the covering or plate through which the molten material passes as it is discharged from the receiving-vessel by the action of centrifugal force. This space may be very small, as the molten material constantly discharges in fine streams or particles in every direction as the receiving-vessel is rotated. By the use of this covering or plate much of the heat is retained in the receiving-vessel, which is very desirable during certain stages of its operation, as hereinafter described.

In Fig. 3 we have shown the cover B as a suspended and removable section of the general cover, C, depressed below its surface.

As shown, it is provided with a rim resting in a ring around the hole or opening in the general cover in which it is placed, and which suspends it the required distance above the mouth of the receiving-vessel. It is of course provided with a hole for the introduction of the molten material into the receiving-vessel.

In Fig. 4 the covering B consists of an annular flange depending from the under side of the general cover over the walls of the mouth or neck of the receiving-vessel, leaving the required space between them for the discharge of the molten material. In this case the cover B is provided with a hole in its central portion, in which, preferably, a removable spout, hereinafter described, is inserted, so as to extend down to the opening of the mouth of the receiving-vessel. It is obvious that the cover B is capable of various modifications in arrangement and form, of which we have shown three as illustrations, and yet operate to prevent the heat from escaping from the receiving-vessel, and so we do not wish to confine ourselves to precise details of construction. We also prefer to provide the top or cover C, which serves as the general cover of the apparatus, with what may be termed a "bowl," D, with a hole over the mouth or neck of the receiving-vessel, and to employ a removable spout, E, adapted to set in the hole in the bottom of the bowl and direct the molten material into preferably the center of the mouth or neck of the receiving-vessel. This removable spout may also be made of refractory material, so as to preserve it from injury from its contact with the molten material flowing into the receiving-vessel.

We also prefer to make what may be termed an "annular tub," F, adapted to fit around, preferably, the upper part of the mouth or neck of the receiving-vessel and extending down some distance below the top, as shown in Fig. 1. This annular tub may be supported in brackets G or other suitable supports. It may be of such depth and capacity as to receive and retain a considerable quantity of molten material, and it may be supplied with a discharge spout or orifice near the top, through which the molten material can flow off, as it reaches the same, into a car or other means for conveying it away. Means may also be provided for removing the annular tub whenever desired, and to this end we prefer to provide it with ears e, in which a hook or bail, operated by a crane or other convenient means, may be inserted whenever it is desired to remove the tub, in which case the top or cover of the apparatus must of course first be removed. We prefer to provide the walls of the tub with annular spiral inclosed channels or grooves H, although it may be made with double walls, affording an undivided space between them, if preferred. These channels or spaces afford means for driving a current or blast of air into and around the annular tub heated by the molten material being discharged into it from the receiving-vessel, so that the air will become heated to a very high temperature, to be carried through a pipe, I, to any place of use desired. We also prefer to provide the under side of the top or cover of the apparatus C with a series of pipes, J, through which a current or blast of air may be driven, so as to heat it to a very high temperature. Although we prefer to attach these pipes J to the under side of the cover C, it is obvious that any arrangement may be adopted which will locate them over and in proximity to the molten material being discharged from the mouth of the receiving-vessel, so that they will be heated thereby. We have shown a pipe, K, leading from this series of pipes into the mouth of the receiving-vessel, so that the heated air may be discharged into such vessel, if desired. The object of thus providing means for introducing a blast of heated air into the receiving-vessel is to supply it with heated air for the combustion of fuel that may be introduced into the vessel, to maintain it at a sufficient temperature to prevent the molten material contained therein from becoming wholly or partially solidified when the introduction of additional molten material is interrupted or at any time desired. When the heated air from the pipes J is not being discharged into the receiving-vessel, it may be carried to any other place for use. We have shown a cock or valve, L, on a portion of the pipe extending above the top or cover of the apparatus, by which its introduction into the receiving-vessel may be permitted or prevented.

It will of course be understood that suitable means are employed to force or drive a current of air through the channels H and pipes J.

What we regard as new, and desire to secure by Letters Patent, is—

1. In an apparatus for decomposing metallic salts or salts of metals and desulphurizing ores when in a molten state, the combination of a revoluble receiving-vessel adapted to receive molten material to be treated, having its contracted neck or mouth lined with refractory material capable of withstanding great heat, a cover for the neck or mouth of the receiving-vessel, with space between the cover and the neck or mouth to permit the discharging material to escape therefrom, and means for rotating the receiving-vessel, substantially as described.

2. In an apparatus for decomposing metallic salts or salts of metals and desulphurizing ores when in a molten state, the combination of a revoluble receiving-vessel adapted to receive molten material to be treated, having its contracted neck or mouth lined with refractory material capable of withstanding great heat, a cover over the neck or mouth of the receiving-vessel, adjustable up or down to increase or diminish the space between the cover and the neck or mouth, through which the material is discharged, and means for rotating the receiving-vessel, substantially as described.

3. In an apparatus for decomposing metallic salts or salts of metals and desulphurizing ores when in a molten state, the combination of a revoluble receiving-vessel adapted to receive molten material to be treated, a cover over the neck or mouth of the receiving-vessel, with space between the cover and the neck or mouth to permit the discharging material to escape therefrom, a removable spout directing the molten material, preferably, into the center of the neck or mouth of the receiving-vessel, and means for rotating the receiving-vessel, substantially as described.

4. In an apparatus for decomposing metallic salts or salts of metals and desulphurizing ores when in a molten state, the combination of a revoluble receiving-vessel adapted to receive molten material to be treated, a cover over the neck or mouth of the receiving-vessel, with space between the cover and the neck or mouth to permit the discharging material to escape therefrom, a removable spout directing the molten material, preferably, into the center of the neck or mouth of the receiving-vessel, a bowl surrounding the removable spout, and means for rotating the receiving-vessel, substantially as described.

5. In an apparatus for decomposing metallic salts or salts of metals and desulphurizing ores when in a molten state, the combination of a revoluble receiving-vessel adapted to receive molten material to be treated, a removable annular tub surrounding the same and adapted to receive molten material discharged from the mouth of the receiving-vessel, and means for rotating the receiving-vessel, substantially as described.

6. In an apparatus for decomposing metallic salts or salts of metals and desulphurizing ores when in a molten state, the combination of a revoluble receiving-vessel adapted to receive molten material to be treated, a removable annular tub surrounding the same and adapted to receive the molten material discharged from the mouth of the receiving-vessel, and provided with a space in its walling, into and through which a blast or current of air may be passed and heated by the molten material discharged into the tub, and means for rotating the receiving-vessel, substantially as described.

7. In an apparatus for decomposing metallic salts or salts of metals and desulphurizing ores when in a molten state, the combination of a revoluble receiving-vessel adapted to receive molten material to be treated, a series of pipes arranged over the same and in proximity to the molten material discharged from the mouth of the receiving-vessel, and means for rotating the receiving-vessel, substantially as described.

PHINEAS H. ADAMS, Jr.
ORSEMAS T. X. ADAMS.

Witnesses:
EPHRAIM BANNING,
H. A. FARNHAM.